United States Patent
Connell, II et al.

(10) Patent No.: US 11,361,638 B2
(45) Date of Patent: Jun. 14, 2022

(54) GUNSHOT DETECTION SENSORS INCORPORATED INTO BUILDING MANAGEMENT DEVICES

(71) Applicant: Johnson Controls Fire Protection LP, Boca Raton, FL (US)

(72) Inventors: Thomas Wysong Connell, II, Westminster, MA (US); Alan Levin, III, Bolton, MA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/968,944

(22) PCT Filed: Feb. 14, 2019

(86) PCT No.: PCT/IB2019/051209
§ 371 (c)(1),
(2) Date: Aug. 11, 2020

(87) PCT Pub. No.: WO2019/159105
PCT Pub. Date: Aug. 22, 2019

(65) Prior Publication Data
US 2021/0056821 A1    Feb. 25, 2021

Related U.S. Application Data

(60) Provisional application No. 62/637,161, filed on Mar. 1, 2018, provisional application No. 62/631,296, filed on Feb. 15, 2018.

(51) Int. Cl.
*G08B 13/16* (2006.01)
*G08B 17/00* (2006.01)
(Continued)

(52) U.S. Cl.
CPC ......... *G08B 13/1672* (2013.01); *G06F 16/61* (2019.01); *G06F 21/602* (2013.01);
(Continued)

(58) Field of Classification Search
CPC .... G08B 13/1672; G08B 19/00; G08B 25/10; G08B 17/00
(Continued)

(56) References Cited

U.S. PATENT DOCUMENTS 4,709,330 A * 11/1987 Yokoi .................. A62B 3/00
340/573.4
5,504,717 A     4/1996 Sharkey et al.
(Continued)

FOREIGN PATENT DOCUMENTS

CN     102 843 205 B    12/2012
EP       1 806 952 A2     7/2007
(Continued)

OTHER PUBLICATIONS

International Search Report and Written Opinion of the International Searching Authority, dated Jun. 18, 2019, from International Application No. PCT/IB2019/051202, filed on Feb. 14, 2019. 24 pages.
(Continued)

*Primary Examiner* — John A Tweel, Jr.
(74) *Attorney, Agent, or Firm* — HoustonHogle LLP (57) ABSTRACT

A gunshot detection system provides integration with building management systems installed in a common building. Distributed devices of the building management systems (e.g. light fixtures, smoke detectors, thermostats, exit signs) are positioned throughout the building, and gunshot sensor units of the gunshot detection system are incorporated with, attached to and/or combined with the building management distributed devices. The gunshot sensor units share a com-
(Continued)

mon housing with the distributed building management devices, attach to the devices via attachment mechanisms, and/or are incorporated into hybrid devices that include gunshot sensor and building management elements. The gunshot sensor units might comprise reflectors for collecting and focusing sound waves onto microphones of the gunshot sensor units. These reflectors could be existing parts of building management devices, or common housings for the gunshot sensor units and the building management devices, and/or parts of the gunshot sensor units independent of the building management devices.

12 Claims, 7 Drawing Sheets (51) Int. Cl.
| | | |
|---|---|---|
| G08B 17/06 | (2006.01) | |
| G08B 25/10 | (2006.01) | |
| G08B 25/14 | (2006.01) | |
| H04L 41/06 | (2022.01) | |
| G08B 29/18 | (2006.01) | |
| G08B 29/24 | (2006.01) | |
| G06F 16/61 | (2019.01) | |
| H04W 12/037 | (2021.01) | |
| G06F 21/60 | (2013.01) | |
| G06Q 50/26 | (2012.01) | |
| H04L 9/08 | (2006.01) | |
| H04L 9/14 | (2006.01) | |
| H04W 56/00 | (2009.01) | |
| G08B 19/00 | (2006.01) | |
| G08B 25/04 | (2006.01) | |
| G07C 9/00 | (2020.01) | |
| G08B 7/06 | (2006.01) | |
| G08B 25/01 | (2006.01) | |
| H04W 84/18 | (2009.01) | |
| H04W 84/20 | (2009.01) | |

(52) U.S. Cl.
CPC ....... *G06Q 50/265* (2013.01); *G07C 9/00182* (2013.01); *G08B 7/066* (2013.01); *G08B 17/00* (2013.01); *G08B 17/06* (2013.01); *G08B 19/00* (2013.01); *G08B 25/014* (2013.01); *G08B 25/04* (2013.01); *G08B 25/10* (2013.01); *G08B 25/14* (2013.01); *G08B 29/188* (2013.01); *G08B 29/24* (2013.01); *H04L 9/0894* (2013.01); *H04L 9/14* (2013.01); *H04L 41/06* (2013.01); *H04W 12/037* (2021.01); *H04W 56/0015* (2013.01); *H04W 84/18* (2013.01); *H04W 84/20* (2013.01)

(58) Field of Classification Search
USPC ..................................................... 340/686.1
See application file for complete search history.

(56) References Cited

U.S. PATENT DOCUMENTS

| | | | |
|---|---|---|---|
| 5,973,998 A | 10/1999 | Showen et al. | |
| 6,552,963 B2 * | 4/2003 | Baranek | G08B 7/066 367/129 |
| 6,970,183 B1 * | 11/2005 | Monroe | G08B 7/062 348/143 |
| 7,228,429 B2 * | 6/2007 | Monroe | G08B 25/085 713/182 |
| 7,411,865 B2 | 8/2008 | Calhoun | |
| 7,460,006 B2 * | 12/2008 | Kates | G08B 25/10 340/425.1 |
| 7,676,194 B2 | 3/2010 | Rappaport | |
| 7,843,356 B2 | 11/2010 | Webb | |
| 7,986,231 B1 | 7/2011 | Bentley et al. | |
| 8,149,649 B1 | 4/2012 | Brinn et al. | |
| 8,806,632 B2 | 8/2014 | Stefanidakis et al. | |
| 9,432,720 B2 | 8/2016 | Kruglick | |
| 9,642,131 B2 | 5/2017 | Bohlander et al. | |
| 9,672,700 B2 | 6/2017 | Lax | |
| 9,672,727 B1 | 6/2017 | Alexander et al. | |
| 9,679,459 B2 * | 6/2017 | Crowe | G08B 15/02 |
| 9,830,932 B1 | 11/2017 | Gunderson et al. | |
| 9,888,371 B1 | 2/2018 | Jacob | |
| 10,089,845 B2 | 10/2018 | Skorpik et al. | |
| 10,102,732 B2 | 10/2018 | Gersten | |
| 10,586,109 B1 | 3/2020 | Fowler et al. | |
| 10,657,800 B1 | 5/2020 | Fowler et al. | |
| 10,741,058 B1 * | 8/2020 | Miller | E05C 17/443 |
| 10,928,244 B2 | 2/2021 | Warren et al. | |
| 11,170,619 B2 | 11/2021 | Connell, II et al. | |
| 11,282,536 B2 | 3/2022 | Davis et al. | |
| 2006/0109113 A1 | 5/2006 | Reyes et al. | |
| 2008/0165621 A1 | 7/2008 | Fisher et al. | |
| 2009/0222241 A1 | 9/2009 | Dorogi et al. | |
| 2010/0271905 A1 | 10/2010 | Khan et al. | |
| 2010/0305778 A1 | 12/2010 | Dorneich et al. | |
| 2011/0169633 A1 | 7/2011 | Lauder et al. | |
| 2014/0218518 A1 | 8/2014 | Oliver | |
| 2014/0222943 A1 | 8/2014 | Oleson et al. | |
| 2014/0269199 A1 | 9/2014 | Weldon et al. | |
| 2014/0277609 A1 | 9/2014 | Nye et al. | |
| 2014/0327543 A1 | 11/2014 | Showen et al. | |
| 2014/0340222 A1 | 11/2014 | Thornton et al. | |
| 2015/0061869 A1 | 3/2015 | Crowe et al. | |
| 2015/0070166 A1 | 3/2015 | Boyden et al. | |
| 2015/0077550 A1 | 3/2015 | Apelbaum et al. | |
| 2015/0339913 A1 | 11/2015 | Lyman et al. | |
| 2015/0347079 A1 | 12/2015 | Price et al. | |
| 2016/0232774 A1 | 8/2016 | Noland et al. | |
| 2016/0260307 A1 | 9/2016 | Skorpik et al. | |
| 2016/0269397 A1 | 9/2016 | Camenisch et al. | |
| 2016/0379456 A1 | 12/2016 | Nongpiur et al. | |
| 2017/0045336 A1 | 2/2017 | Crowe et al. | |
| 2017/0069190 A1 | 3/2017 | Hansen et al. | |
| 2017/0103643 A1 | 4/2017 | Powers, III et al. | |
| 2017/0169686 A1 | 6/2017 | Skorpik et al. | |
| 2017/0289650 A1 | 10/2017 | Schattmaier et al. | |
| 2017/0301220 A1 | 10/2017 | Jarrell et al. | |
| 2018/0053394 A1 | 2/2018 | Gersten | |
| 2018/0122030 A1 | 5/2018 | Raz et al. | |
| 2018/0160278 A1 | 6/2018 | Patel et al. | |
| 2018/0199179 A1 | 7/2018 | Rauner | |
| 2019/0130723 A1 | 5/2019 | Thiel et al. | |
| 2019/0213901 A1 | 7/2019 | Kur et al. | |
| 2019/0347920 A1 | 11/2019 | Anderson et al. | |
| 2021/0158837 A1 | 5/2021 | Saki et al. | |
| 2021/0202067 A1 | 7/2021 | Williams et al. | |

FOREIGN PATENT DOCUMENTS

| | | |
|---|---|---|
| EP | 3032508 A1 | 6/2016 |
| JP | 2001236822 A | 8/2001 |
| JP | 4973380 B2 | 7/2012 |
| JP | 2017520831 | 7/2017 |
| WO | WO 9110980 | 7/1991 |
| WO | WO 2010039130 | 4/2010 |
| WO | WO 2010111556 | 9/2010 |
| WO | WO 2011134371 | 11/2011 |
| WO | WO 2012092562 | 7/2012 |
| WO | WO 2018044553 | 3/2018 |
| WO | WO 2018044556 | 3/2018 |
| WO | WO 2018185723 | 10/2018 |
| WO | WO 2019159098 | 8/2019 |
| WO | WO 2019159099 | 8/2019 |
| WO | WO 2019159100 | 8/2019 |
| WO | WO 2019159101 | 8/2019 |
| WO | WO 2019159102 | 8/2019 |

(56) References Cited

FOREIGN PATENT DOCUMENTS

| WO | WO 2019159103 | 8/2019 |
|----|---------------|--------|
| WO | WO 2019159104 | 8/2019 |
| WO | WO 2019159106 | 8/2019 |

OTHER PUBLICATIONS

International Search Report and Written Opinion of the International Searching Authority, dated May 21, 2019, from International Application No. PCT/IB2019/051203, filed on Feb. 14, 2019. 13 pages.
International Search Report and Written Opinion of the International Searching Authority, dated May 14, 2019, from International Application No. PCT/IB2019/051204, filed on Feb. 14, 2019. 15 pages.
International Search Report and Written Opinion of the International Searching Authority, dated Jul. 12, 2019, from International Application No. PCT/IB2019/051205, filed on Feb. 14, 2019. 23 pages.
International Search Report and Written Opinion of the International Searching Authority, dated Jun. 12, 2019, from International Application No. PCT/IB2019/051206, filed on Feb. 14, 2019. 13 pages.
International Search Report and Written Opinion of the International Searching Authority, dated Jun. 14, 2019, from International Application No. PCT/IB2019/051207, filed on Feb. 14, 2019. 13 pages.
International Search Report and Written Opinion of the International Searching Authority, dated May 31, 2019, from International Application No. PCT/IB2019/051208, filed on Feb. 14, 2019. 18 pages.
International Search Report and Written Opinion of the International Searching Authority, dated Jul. 23, 2019, from International Application No. PCT/IB2019/051209, filed on Feb. 14, 2019. 20 pages.
International Search Report and Written Opinion of the International Searching Authority, dated May 24, 2019, from International Application No. PCT/IB2019/051210, filed on Feb. 14, 2019. 15 pages.
Partial Search Report dated Apr. 24, 2019, from International Application No. PCT/IB2019/051202, filed on Feb. 14, 2019. 14 pages.
Partial Search Report dated May 17, 2019, from International Application No. PCT/IB2019/051205, filed on Feb. 14, 2019. 13 pages.
Partial Search Report dated May 31, 2019, from International Application No. PCT/IB2019/051209, filed on Feb. 14, 2019. 12 pages.
International Preliminary Report on Patentability dated Aug. 27, 2020 from International Application No. PCT/IB2019/051202, filed Feb. 14, 2019. 14 pages.
International Preliminary Report on Patentability dated Aug. 27, 2020, from International Application No. PCT/IB2019/051203, filed on Feb. 14, 2019. 7 pages.
International Preliminary Report on Patentability dated Aug. 27, 2020, from International Application No. PCT/IB2019/051204, filed on Feb. 14, 2019. 9 pages.
International Preliminary Report on Patentability dated Aug. 27, 2020, from International Application No. PCT/IB2019/051205, filed on Feb. 14, 2019. 23 pages.
International Preliminary Report on Patentability dated Aug. 27, 2020, from International Application No. PCT/IB2019/051206, filed on Feb. 14, 2019. 8 pages.
International Preliminary Report on Patentability dated Aug. 27, 2020, from International Application No. PCT/IB2019/051207, filed on Feb. 14, 2019. 8 pages.
International Preliminary Report on Patentability dated Aug. 27, 2020, from International Application No. PCT/IB2019/051208, filed on Feb. 14, 2019. 12 pages.
International Preliminary Report on Patentability dated Aug. 27, 2020, from International Application No. PCT/IB2019/051209, filed on Feb. 14, 2019. 12 pages.
International Preliminary Report on Patentability dated Aug. 27, 2020, from International Application No. PCT/IB2019/051210, filed on Feb. 14, 2019. 9 pages.

* cited by examiner

GUNSHOT DETECTION SENSORS INCORPORATED INTO BUILDING MANAGEMENT DEVICES

RELATED APPLICATIONS

This application is a § 371 National Phase Application of International Application No. PCT/IB2019/051209, filed on Feb. 14, 2019, which claims the benefit under 35 USC 119(e) of U.S. Provisional Application No. 62/631,296, filed on Feb. 15, 2018, and U.S. Provisional Application No. 62/637,161, filed on Mar. 1, 2018, all of which are incorporated herein by reference in their entirety.

This application is related to:

International Application number PCT/IB2019/051202 filed Feb. 14, 2019, entitled "Gunshot detection system with forensic data retention, live audio monitoring, and two-way communication," now International Patent Publication No.: WO 2019/159098;

International Application number PCT/IB2019/051203 filed on Feb. 14, 2019, entitled "Gunshot detection system with master slave timing architecture," now International Patent Publication No.: WO 2019/159099;

International Application number PCT/IB2019/051204 filed on Feb. 14, 2019, entitled "Gunshot detection system with encrypted, wireless transmission," now International Patent Publication No.: WO 2019/159100;

International Application number PCT/IB2019/051205 filed on Feb. 14, 2019, entitled "Gunshot detection system with building management system integration," now International Patent Publication No.: WO 2019/159101;

International Application number PCT/IB2019/051206 filed on Feb. 14, 2019, entitled "Gunshot detection system anti-tampering protection," now International Patent Publication No.: WO 2019/159102;

International Application number PCT/IB2019/051207 filed on Feb. 14, 2019, entitled "Gunshot detection system with ambient noise modeling and monitoring," now International Patent Publication No.: WO 2019/159103;

International Application number PCT/IB2019/051208 filed on Feb. 14, 2019, entitled "Gunshot detection system with fire alarm system integration," now International Patent Publication No.: WO 2019/159104; and International Application number PCT/IB2019/051210 filed on Feb. 14, 2019, entitled "Gunshot detection system with location tracking," now International Patent Publication No.: WO 2019/159106.

BACKGROUND OF THE INVENTION

Shooting incidents, involving active shooters shooting victims within buildings such as schools or malls, are increasingly a concern. Identifying and reacting quickly to such incidents can reduce loss of life. For example, first responders need to know if gunshots have actually been fired and the location and number of the fired shots.

In confined areas, such as in a school or a private or public building, detecting and locating the source of gunshots is a complicated problem. A gunshot typically generates several sounds including the gunshot itself, the bullet's bow shockwave, noise from bullet impacts and noise of reflected gunshot sounds. In addition, numerous noises are generated in buildings that may be mistakenly identified as gunshots.

The broad concept of detecting gunshots utilizing acoustics is known. More specifically, it is known to provide a gunshot detection system including an array of acoustic sensors positioned in a pattern which enables signals from the sensors to be employed to not only detect the firing of a gunshot but to also locate the origin of the shot. One main requirement of such a system is the need to accurately distinguish between the sound produced from a gunshot and a host of other ambient sounds. In at least one known arrangement, a microphone is used to detect each sound, which is then amplified, converted to an electrical signal and then the electrical signal is compared with a threshold value above which a gunshot sound is expected to exceed.

Recently, gunshot detection systems with improved accuracy, dependability, and effectiveness have been described. One such system is described in International Publication Number WO 2018/044553, published on Mar. 8, 2018 and entitled "System and Method for Acoustically Identifying Gunshots Fired Indoors." This system provides for low false alarms or false positives and high detection rates by employing two microelectromechanical microphones (MEMs) having different sensitivity levels. Acoustic signals from a first microphone with lower sensitivity (for example, making the anomaly detection microphone essentially deaf to routine sounds) are first analyzed for a peak amplitude level large enough to be a potential gunshot. Then acoustic signals from a second microphone having a higher sensitivity are then analyzed further to confirm that the sound was a gunshot.

Gunshot detection methods have also been proposed that can count the number of gunshots fired, particularly from an automatic or fast acting weapon. One such method is described in International Publication Number WO 2018/044556, published on Mar. 8, 2018 and entitled "Method for Acoustically Counting Gunshots Fired Indoors." In this method, an acoustic signature of captured noise is analyzed to accurately count how many shots are fired. The method can be employed to identify that the gun is an automatic or rapid fire weapon, which information can be provided to emergency personnel.

Additionally, gunshot detection system that can accurately determine where sensed events are located have been proposed. One such system is described in International Publication Number WO 2018/185723, published on Oct. 11, 2018 and entitled "System and Method for Identifying and Locating Sensed Events." Here, a sensor network is employed to detect an event in the form of an audible signal. The event is time stamped and sent to a controller, which evaluates the event as either unique or a multiple detection using the sensor's time of alarm to determine which sensor activated first and to suppress subsequent alarms for the same event. This process is known as de-confliction.

At the same time, many premises with gunshot detection systems are also equipped with one or more building management systems such as access control systems, building automation systems, and/or fire alarm systems. In general, these building management systems are installed within a premises such as commercial, residential, or governmental buildings. Examples of these buildings include offices, hospitals, warehouses, public infrastructure buildings including subways and bus terminals, multi-unit dwellings, schools or universities, shopping malls, government offices, and casinos.

In general, building management systems include one or more control panels or controllers connected to and controlling distributed devices, which perform the building management functions of the building management system. The controllers and distributed devices communicate via wired and/or wireless networks supporting digital and/or analog communication between the devices.

Access control systems typically include control panels such as system controllers and door controllers, and distributed devices, including door position sensors, access control readers, and actuators like electric door locks, to list a few examples. The access control readers are often installed at access points of the buildings to control access to restricted areas, such as buildings or areas of the buildings. Examples of access points include front and interior doors of a building, elevators, hallways connecting two areas of a building, escalators leading to restricted areas of the building and/or turnstiles. The access control readers read the information of keycards and/or transmitted from mobile computing devices and then the access control systems determine if the individuals are authorized to access the restricted areas. If the individuals are authorized to enter the restricted areas, then the access control readers allow access to the restricted areas by unlocking locked doors or turnstiles, signaling that doors should be unlocked, and/or activating elevators. Alarms can be generated upon unauthorized entry.

Building automation systems will typically include one or more building automation control panels and distributed devices that control and monitor the physical plant aspects of a building and aspects of business-specific electrical, computer, and mechanical systems. The physical plant typically includes heating, ventilation, and air conditioning (HVAC) systems, elevators/escalators, lighting and power systems, refrigeration and coolant systems, and air and/or water purification systems, in examples. HVAC systems typically include air handlers and systems of ducts and vents for circulating air throughout the building. Business-specific systems include computer systems, manufacturing systems that include various types of computer-aided machinery and test equipment, and inventory control and tracking systems, in examples.

Fire alarm systems typically include fire control panels that function as system controllers. Fire detection/initiation devices and alarm notification devices are then installed, distributed throughout the buildings and connected to the panels. Some examples of fire detection/initiation devices include smoke detectors, carbon monoxide detectors, flame detectors, temperature sensors, and/or pull stations (also known as manual call points). Some examples of fire notification devices include speakers, horns, bells, chimes, light emitting diode (LED) reader boards, and/or flashing lights (e.g., strobes).

The fire detection devices monitor the buildings for indicators of fire. Upon detection of an indicator of fire such as smoke or heat or flames, the distributed device is activated and a signal is sent from the activated distributed device to the fire control panel. The fire control panel then initiates an alarm condition by activating audio and visible alarms of the fire notification devices of the fire alarm system, which are also distributed around the building. Additionally, the fire control panel will also send an alarm signal to a monitoring station, which will notify the local fire department or fire brigade.

SUMMARY OF THE INVENTION

It would be beneficial to enhance the capabilities of gunshot detection systems by providing integration between the gunshot detection systems and building management systems, which might be installed in the same building as the gunshot detection systems. For example, distributed devices of building management systems (e.g. light fixtures, sprinkler heads, smoke detectors, thermostats, exit signs) are already positioned throughout these buildings, many with familiar and/or inconspicuous housings mounted to walls or ceilings of the buildings according to their functionality. Incorporation of gunshot sensor units of the gunshot detection system into these distributed building management devices allows the gunshot sensor units to be concealed while also allowing them to take advantage of existing building management infrastructure, among other benefits.

Gunshot sensor units can share a common housing with the distributed building management devices, attach to the devices via attachment mechanisms, or even be incorporated into hybrid devices that include gunshot sensors and building management elements for performing building management functions. In one embodiment, the gunshot sensor units could even use the shape of a common housing, of any part of the distributed building management device, to create a specifically shaped parabolic microphone allowing more efficient and directional detection of shot sounds.

In general, according to one aspect, the invention features a system for detecting gunshots, including gunshot sensor units and reflectors. The gunshot sensor units detect the gunshots via one or more microphones of the gunshot sensor units, which detect acoustic anomalies. The reflectors collect and focus sound waves onto the microphones.

In embodiments, the reflectors also direct light emitted by lighting units for illuminating areas of a premises where the gunshot sensor units are located. The gunshot sensor units might share with the lighting units common housings that include the reflectors. On the other hand, the lighting units might comprise the reflectors, in which case the gunshot sensor units comprise attachment mechanisms for securing the gunshot sensor units to the lighting units in positions enabling the reflectors to collect and focus the sound waves onto the microphones. In another example, the gunshot sensor units might comprise the reflectors. The one or more microphones might also be used by the gunshot sensor units to generate audio data depicting the acoustic anomalies in addition to simply detecting the anomalies.

In general, according to another aspect, the invention features a method for detecting gunshots. Reflectors collect and focus sound waves onto one or more microphones of the gunshot sensor units, which detect the gunshots. Acoustic anomalies are then detected via the one or more microphones.

In general, according to another aspect, the invention features a hybrid gunshot sensor unit. The hybrid gunshot sensor unit includes a gunshot sensor for detecting gunshots and at least one building system element. The gunshot sensor comprises one or more microphones for detecting acoustic anomalies.

In general, according to another aspect, the invention features a system for detecting gunshots within a premises. Gunshot sensor units detect the gunshots. The units are secured to distributed devices of one or more building management systems for the premises via attachment mechanisms of the gunshot sensor units.

In general, according to another aspect, the invention features a method for detecting gunshots within a premises. Gunshot sensor units, which detect gunshots, are secured to distributed devices of one or more building management systems for the premises via attachment mechanisms of the gunshot sensor units.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
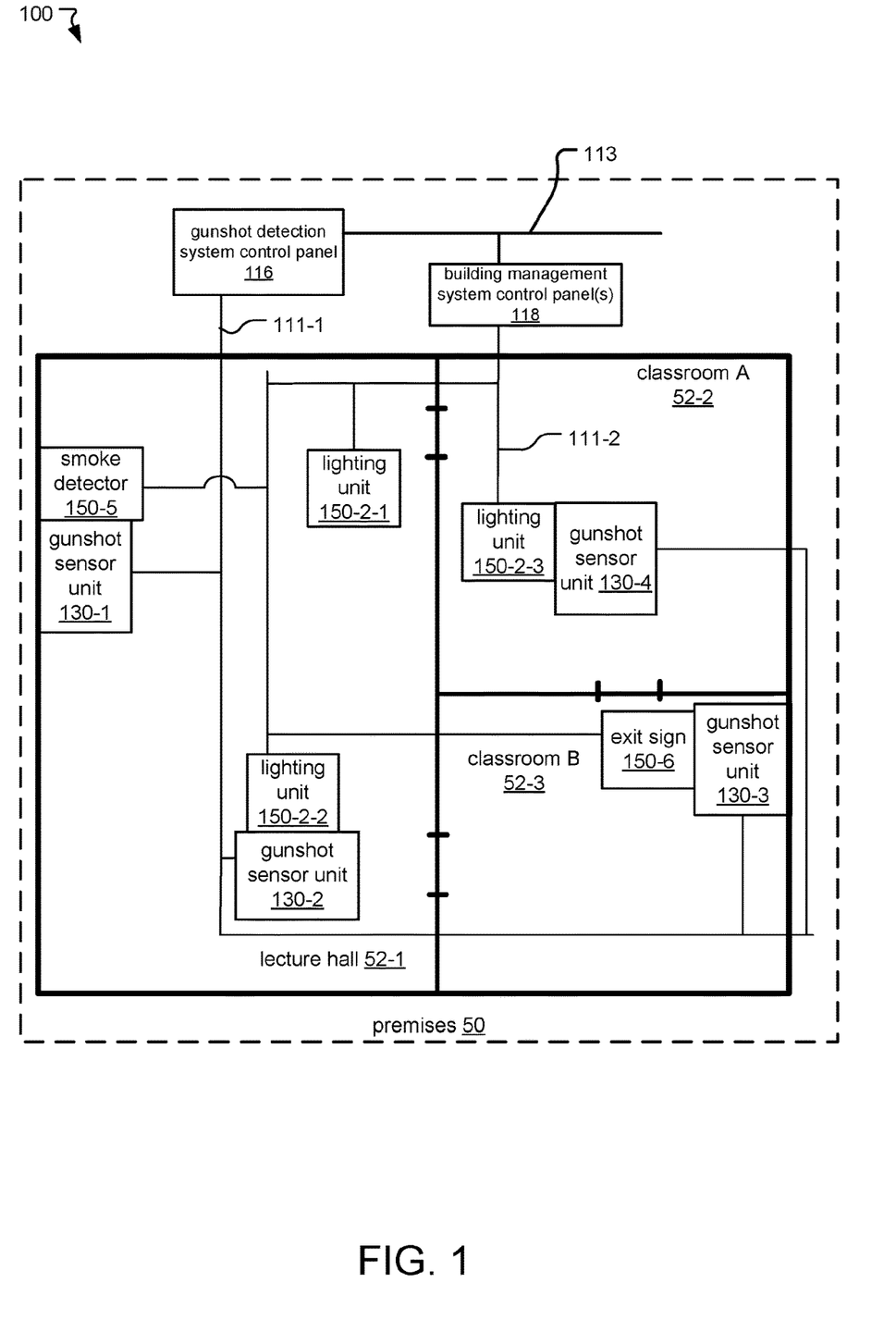
FIG. 1 is a schematic diagram of an exemplary gunshot detection system according to an embodiment of the present invention.

FIG. 1 is a schematic diagram of an exemplary gunshot detection system 100.

In general, the gunshot detection system 100 monitors, detects and reports the occurrence of gunshots or other emergencies within one or more premises 50 such as buildings (e.g. offices, hospitals, warehouses, retail establishments, shopping malls, schools, multi-unit dwellings, government buildings). The premises 50 also includes one or more building management systems, which control and monitor various equipment and conditions throughout the premises 50 and can include building automation systems, fire alarm systems, and/or access control systems, among other examples.

In the illustrated example, the premises 50 is a simplified floor example of a building with three areas 52 (e.g. rooms, hallways, lobbies, stairways), a lecture hall 52-1, classroom A 52-2, and classroom B 52-3.

In one configuration (illustrated), the gunshot detection system 100 includes gunshot sensor units 130 and a gunshot detection system control panel 116. The gunshot sensor units 130 detect conditions indicative of the gunshots or other emergencies and alert the control panel 116, which takes one or more responsive actions such as alerting building personnel, law enforcement, and/or a monitoring center, or collecting and presenting data pertaining to the detected gunshots to an operator of the gunshot detection system control panel 116. In other configurations, the gunshot sensor units 130 could be standalone devices that perform the gunshot detection functions (e.g. generating and sending alerts to users) without communicating with a control panel 116.

Similarly, the building management systems typically include building management system control panels 118 and distributed building management system devices 150 positioned throughout the premises 50. The control panels 118 direct the functionality of the respective building management systems by receiving signals and/or data (for example, from the distributed devices 150), sending instructions, and determining and sending status information or sensor data, among other examples, to be displayed on or utilized by the distributed devices 150.

In both the gunshot detection system 100 and in the building management systems, the gunshot sensor units 130 and distributed devices 150 communicate with their respective control panels 116, 118 over wired and/or wireless communication networks 111. In general, these communication networks 111 support digital and/or analog communication between the gunshot sensor units 130 or distributed devices 150 and the respective control panels 116, 118. In some embodiments (not illustrated), the distributed devices 130 from multiple different building management systems, and even the gunshot sensor units 130 and control panel 116 from the gunshot detection system 100, could all be connected to the same communication network 111. However, in the illustrated example, the gunshot sensor units 130 communicate with the gunshot detection system control panel 116 via the gunshot detection communication network 111-1, and the building management system distributed devices 150 communicate with the building management system control panels 118 via a separate building management communication network 111-2.

The gunshot sensor units 130 are distributed throughout the premises 50, for example, in the different areas 52 of the premises 50. The gunshot sensor units 130 detect acoustic anomalies indicating potential gunshots and generate audio data depicting the acoustic anomalies. The gunshot sensor units 130 also generate event data based on and descriptive of the acoustic anomalies and locally store and/or send the event data to the control panel 116.

The event data often includes audio data (e.g. digitized audio clips) depicting the acoustic anomalies, metadata including, for example, time information indicating when the acoustic anomalies started and/or stopped, duration information for the acoustic anomalies and/or the audio data depicting the acoustic anomalies, file information, and identification information for the gunshot sensor unit 130, and sensor data generated by the gunshot sensor unit 130. The event data can be locally stored, collected by the control panel 116, transferred to remote servers, and/or transferred to devices of law enforcement entities for forensic analysis, for example.

On the other hand, the gunshot detection system control panel 116 directs the overall functionality of the gunshot detection system 100 by sending instructions (e.g. control messages) to be executed by the gunshot sensor units 130, receiving the event data from the gunshot sensor units 130 and taking the responsive actions based on the event data. The control panel 116 might receive preliminary event data (e.g. metadata indicating time and date information) from multiple gunshot sensor units 130 and perform a de-confliction process in order to determine which event data from the different sensor units 130 pertains to the same detected acoustic anomaly and which of the gunshot sensor units 130 is closest to the source of the acoustic anomaly based on, for example, which of the units first detected the acoustic anomaly. The control panel 116 might then send instructions to the gunshot sensor unit 130 closest to the source to send full event data (e.g. including a full audio data sample, environmental data, and other sensor data) to the control panel 116 for further processing and/or to be presented to the operator. The gunshot detection system control panel 116 also presents information to an operator of the control panel 116 and receives selections, for example, via a graphical user interface (GUI), the selections indicating various configuration settings and/or actions to be taken by the control panel 116 with respect to the gunshot sensor units 130, to list a few examples.

The building management system distributed devices 150 are positioned throughout the premises 50 and perform the management and/or automation functions of the building management system via building management system elements including controllers or control panels, sensors, user interface elements, and/or actuators, among other examples. Of these, the sensors detect environmental conditions of the premises 50 and send sensor data to be used by the controllers. The user interface elements present information to occupants of the premises 50 and receive user input (e.g. via touchscreen displays). The actuators effect changes throughout the premises 50 in order to, for example, control the environmental conditions or building equipment. The controllers direct the functionality of the respective building management systems by receiving signals and/or sensor data (for example, from other distributed devices 150 such as the sensors or user interface elements), and generating and sending status information and/or instructions, among other examples, to other distributed devices 150 (for example, to the actuators and/or the user interface elements). Some distributed devices 150 (e.g. thermostats of building automation systems) combine functionality of controllers, sensors, user interface elements and actuators in one device.

More specifically, among the building management systems installed at the premises 50 might be a building automation system, a fire alarm system, and/or an access control system, among other examples. For the sake of clarity, in the illustration, only one building management system control panel 118 and building management communication network 111-2 is represented, with distributed devices 150 from different types of systems connected to the same control panel 118 via the same network 111-2. In practice, the premises 50 could include more than one building management control panel 118 or building management communication network 111-2, the distributed devices 150 could connect to different control panels 118 via different networks 111-2, and/or the distributed devices 150 could be standalone devices that perform their building management functions without communicating with a control panel 118.

The building automation system controls and monitors physical plant aspects of the premises 50 and aspects of business-specific electrical, computer, and mechanical systems. The building automation system might include a control panel 118, which is connected via the communication network 111-2 to the building automation distributed devices 150, lighting units 150-2, exit signs 150-6, air handlers, thermostats, projector units, and blinds units, to list a few examples. The air handler heats, cools and/or circulates air throughout the premises via ducts and vents. The projector unit raises or lowers a projector screen. The blinds units control window coverings such as blinds by, for example, raising, lowering, opening, closing and/or controlling other physical mechanisms for adjusting the amount of light allowed to pass through the window. The lighting units 150-2 provide and control illumination (e.g. of an indoor space), for example, via lighting mechanisms such as light bulbs. The exit signs 150-6 indicate and illuminate access points positioned at or along exit routes leading to an exterior of the building. The thermostat 150-8 generates sensor data indicating climate conditions for particular areas 52 of the premises 50 (e.g. via temperature, humidity, and/or other sensors), displays or otherwise indicates status information, receives input indicating climate preferences (e.g. via a touchscreen display or other user interface), and controls the climate conditions by sending the sensor data to the building automation control panel 118 and/or sending instructions to the air handler based on the sensor data.

The fire alarm system monitors for indications of fire in the premises 50 and initiates fire alarms alerting occupants of the premises 50. The fire alarm system includes a control panel 118, which is connected via a communication network 111-2 to the fire alarm distributed devices 150, including alarm initiation devices and fire notification devices. The alarm initiation devices include smoke detectors 150-5 and manually activated devices such as call points and pull stations, carbon monoxide detectors and heat detectors, to list a few examples. The alarm initiation devices monitor the buildings for indicators of fire. Upon detection of indicators of fire, device signals are sent from the alarm initiating devices to the control panel 118. The fire notification devices notify occupants of the premises 50 of a potential fire and generally include sounders, which might include speakers, horns, bells, and/or chimes, and flashing lights (e.g., strobes), and light emitting diode (LED) reader boards, to list a few examples. In response to detection of indicators of fire, the control panel 118 initiates an alarm state, which activates the fire notification devices. Additionally, fire suppression devices can be activated by the control panel in response to detecting the indicators of fire. For example, fire sprinklers release and direct water over an area of the premises 50 to suppress fires in response to instructions from the control panel.

The access control system controls access through access points (e.g. doors, elevators, escalators, turnstiles) to restricted areas of the premises 50. The access control system includes one or more control panels 118, which are connected via the communication network 111-2 to access control distributed devices 150, including, for example, access point controllers with access control readers for receiving input from the occupants of the premises 50 seeking access through the access points to the restricted areas. The access point controllers verify the input by, for example, confirming that the occupant who entered the input is authorized to pass through or access the access point based on authorization information, which might include a list of users authorized to enter restricted areas. The access point controllers also control access through the access points (e.g. by unlocking a door via a door strike, activating a door opening and/or movement mechanism on an elevator, unlocking a turnstile). In one example, the access control reader includes a wireless receiver, which receives identification information broadcast or otherwise transmitted by the user devices such as mobile computing devices, identification badges, and/or beacon devices of the occupants, among other examples.

According to the present invention, the gunshot detection system 100 provides integration between the gunshot sensor units 130 and the building management system distributed devices 150. Specifically, gunshot sensor units 130 are incorporated into, attached to, and/or combined with the building management distributed devices 150.

In the illustrated example, two gunshot sensor units 130-1, 130-2, two lighting units 150-2-1, 150-2-2, and a smoke detector 150-5 are located in the lecture hall 52-1, while one gunshot sensor unit 130-4 and one lighting unit 150-2-3 is located in classroom A 52-2, and one gunshot sensor unit 130-3 and an exit sign 150-6 is located in classroom B 52-3. The gunshot sensor unit 130-1 is integrated with (e.g. incorporated into, attached to, combined with) the smoke detector 150-5, the gunshot sensor unit 130-2 is integrated with the lighting unit 150-2-2, the gunshot sensor unit 130-4 is integrated with the lighting unit 150-2-3, and the gunshot sensor unit 130-3 is integrated with the exit sign 150-6.

Figure 2:
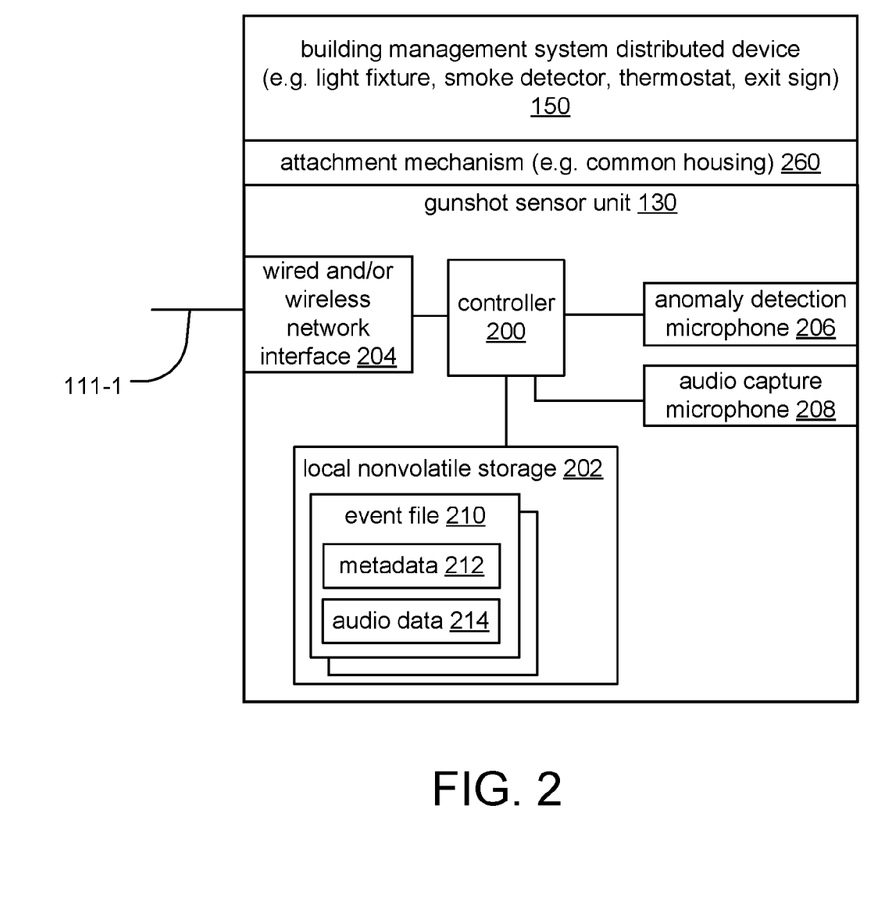
FIG. 2 is a block diagram of a gunshot sensor unit of the gunshot detection system.

FIG. 2 is a block diagram showing an exemplary gunshot sensor unit 130.

The gunshot sensor unit 130 is integrated with the building management system distributed device 150 via an attachment mechanism 260.

The attachment mechanism 260 can take different forms according to different embodiments of the invention. In one example, the attachment mechanism 260 simply secures two discrete devices having separate housings and components together (e.g. via screws, adhesive, clamps, ties). In another example, the attachment mechanism 260 is a common housing shared by the two devices 130, 150 and enclosing at least some of the components of the two devices. In yet another example, gunshot sensor elements of the gunshot sensor units 130 and building management elements of the building management devices 150 are combined into hybrid devices, the hybrid devices including a common housing 260 and a common controller directing both gunshot and building management functionality via the gunshot sensor elements and building management elements.

The gunshot sensor unit 130 includes gunshot sensor elements such as a controller 200, local nonvolatile storage 202, a wired and/or wireless network interface 204, an anomaly detection microphone 206, and an audio capture microphone 208.

The controller 200 executes firmware/operating system instructions and generally directs the functionality of the gunshot sensor unit 130. In one example, the controller 200 is small single-board computer. In other examples, the controller is a microcontroller unit or a system on a chip (SoC), including one or more processor cores along with memory and programmable input/output peripherals such as analog to digital converts and digital to analog converters.

The wired and/or wireless network interface 204 provides connectivity with the gunshot detection system control panel 116 and possibly other devices via the gunshot detection communication network 111-1. In addition, the network also provides power to the devices, in many examples. Direct current (DC) is superimposed upon the data that is transmitted between the devices and other nodes on the network.

The anomaly detection microphone 206 detects the acoustic anomalies, while the audio capture microphone 208 captures ambient sound and generates the audio data. In one embodiment, both microphones 206, 208 are micro electromechanical system (MEMS) microphones having different sensitivity levels, and the controller 200 is configured to sample the microphones 206, 208 such that outputs from the microphones can be continuously analyzed in near real time for an acoustic signature. The anomaly detection microphone 206 has the lower sensitivity level and a high clipping level, while the audio capture microphone 208 has the higher sensitivity level. The audio capture microphone 208 continuously captures ambient sound, which is stored in a 9.9 second (for example) loop in a ring buffer of the controller 200. At the same time, incoming acoustic signals from the anomaly detection microphone 206 are continuously analyzed to detect acoustic anomalies, particularly by searching the incoming acoustic signal for a peak amplitude level large enough to be at least preliminarily identified as a gunshot.

Once an indication of a possible gunshot has been triggered utilizing the anomaly detection microphone 208, further processing may be performed by the controller 200. The controller 200 analyzes the sound stored in the loop to confirm that the acoustic anomaly is a gunshot. If confirmed as gunshot, the controller stores the captured sound stored in the loop buffer, which would include the acoustic anomaly and the previously captured sound (up to 9.9 seconds, in this example) as audio data 214 in the local nonvolatile storage 202 associated with different event files 210 or instances of event data for different gunshot detection events, along with the metadata 212, which includes the time and/or date information for the events. In embodiments, the local nonvolatile storage 202 could be fixed storage such as flash memory, or removable storage such as an SD card, among other examples.

Figure 3:
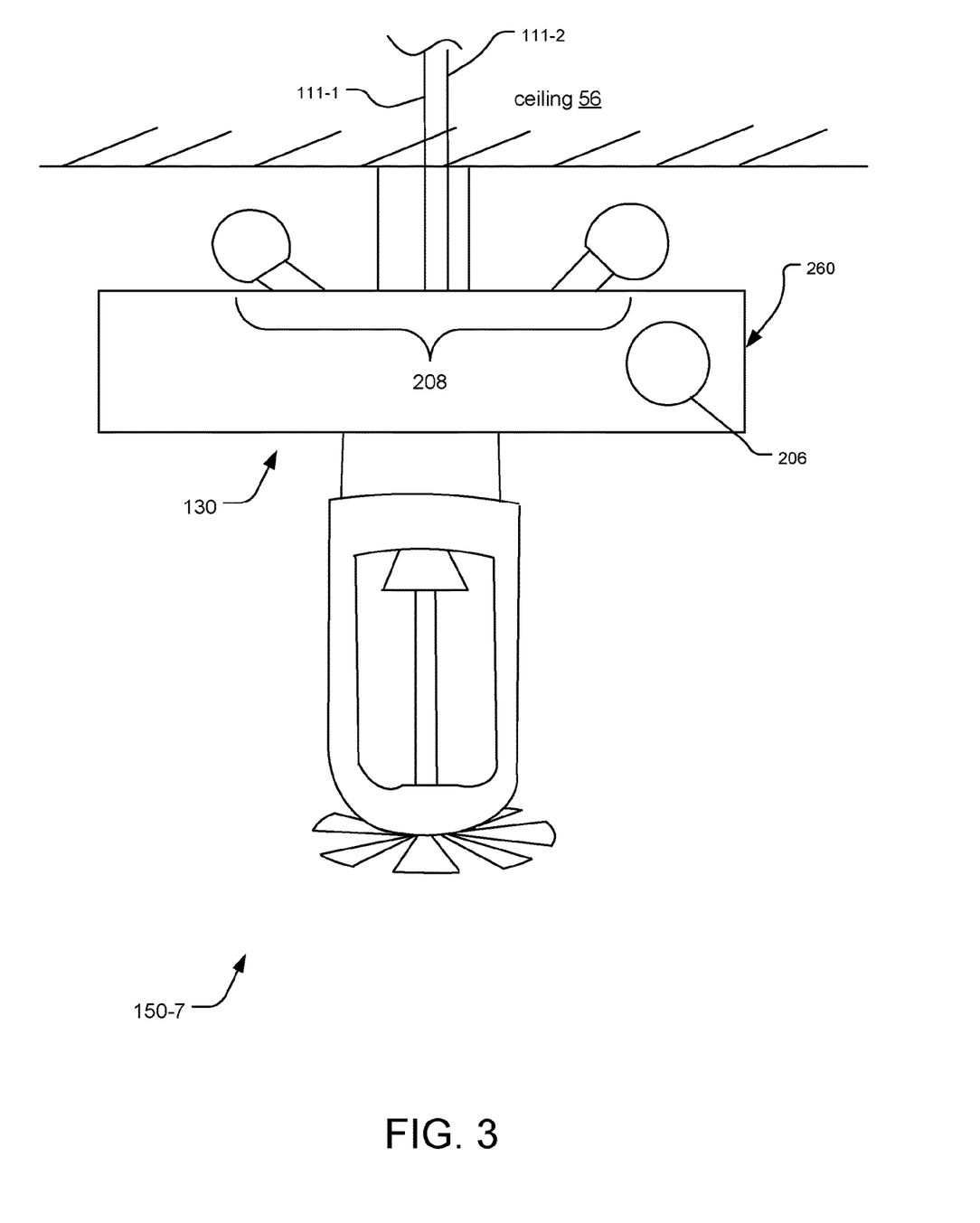
FIG. 3 is an illustration of an exemplary gunshot sensor unit integrated with a fire sprinkler of a fire alarm system.

FIG. 3 is an illustration of an exemplary gunshot sensor unit integrated with a fire sprinkler 150-7 of a fire alarm system. In the illustrated example, the gunshot sensor unit 130 shares a common housing 260 with the fire sprinkler 150-7, which is mounted to a ceiling 56 of an area 52 of the premises 50.

The common housing 260 fully or partially encloses the gunshot sensor elements such as the controller 200, memory 202, network interface 204, and microphones 206, 208 in addition to the building management elements of the fire sprinkler 150-7. The common housing 260 might also include a mount for securing the fire sprinkler 150-7 to the ceiling 56 and concealing wiring between the gunshot sensor elements and the gunshot detection communication network 111-1 and/or between the building management elements and the building management communication network 111-2. The anomaly detection microphone 206 and audio capture microphone 208 might be positioned with respect to the common housing 260 and features of the common housing to allow exposure of the microphones to sound waves in an environment surrounding the fire sprinkler 150-7. In the illustrated example, the anomaly detection microphone 206 is recessed within the common housing 260, while the audio capture microphones 206 protrude from a top side of the common housing 260 and operate within a space between the housing 260 and the ceiling 56. Such a configuration enables full operation of the microphones 206, 208 while also concealing the microphones from the view of building occupants. In one embodiment, the fire sprinkler 150-7 might even include a mounting plate surrounding a base of the mount securing the fire sprinkler 150-7 to the ceiling 56. This mounting plate could serve as a reflector for collecting and focusing sound waves onto the microphones 206, 208.

Figure 4:
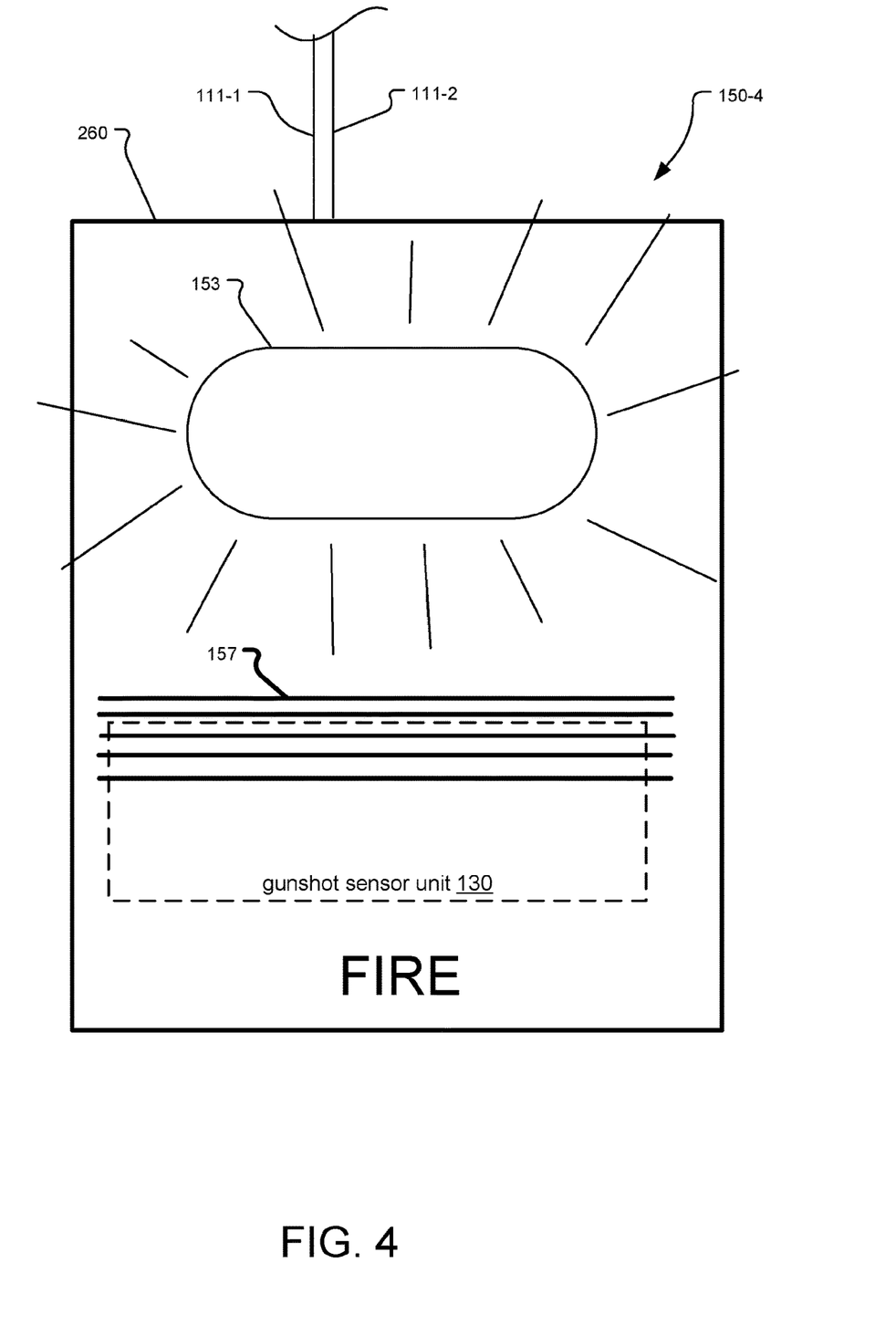
FIG. 4 is an illustration of an exemplary gunshot sensor unit integrated with a fire notification device of a fire alarm system.

FIG. 4 is an illustration of an exemplary gunshot sensor unit 130 integrated with a fire notification device 150-4 of a fire alarm system. In the illustrated example, the gunshot sensor unit 130 shares a common housing 260 with the fire notification device 150-4, which is mounted to a wall of an area 52 of the premises 50.

As with the previous example, the common housing 260 fully or partially encloses the gunshot sensor elements in addition to the building management elements of the fire notification device 150-4 such as a controller, sounders, and/or lights, for example. In the illustrated example, the building management elements of the fire notification device 150-4 include a strobe 153 for intermittently emitting light to alert occupants of the premises 50. The integrated gunshot sensor unit 130 and/or gunshot sensor elements, indicated with dashed lines, are concealed within the common housing 260. A grill 157 is cut or formed at a front face of the common housing 260 near the location of the integrated gunshot sensor unit 130. From the viewpoint of a building occupant, the grill 157 appears to provide ventilation for the internal components of the strobe device fire notification device 150-4. Though the grill 157 does provides ventilation, its primary is to enable the microphones 206, 208 of the included gunshot sensor unit 130 to operate while also being hidden from view of occupants.

Figure 5:
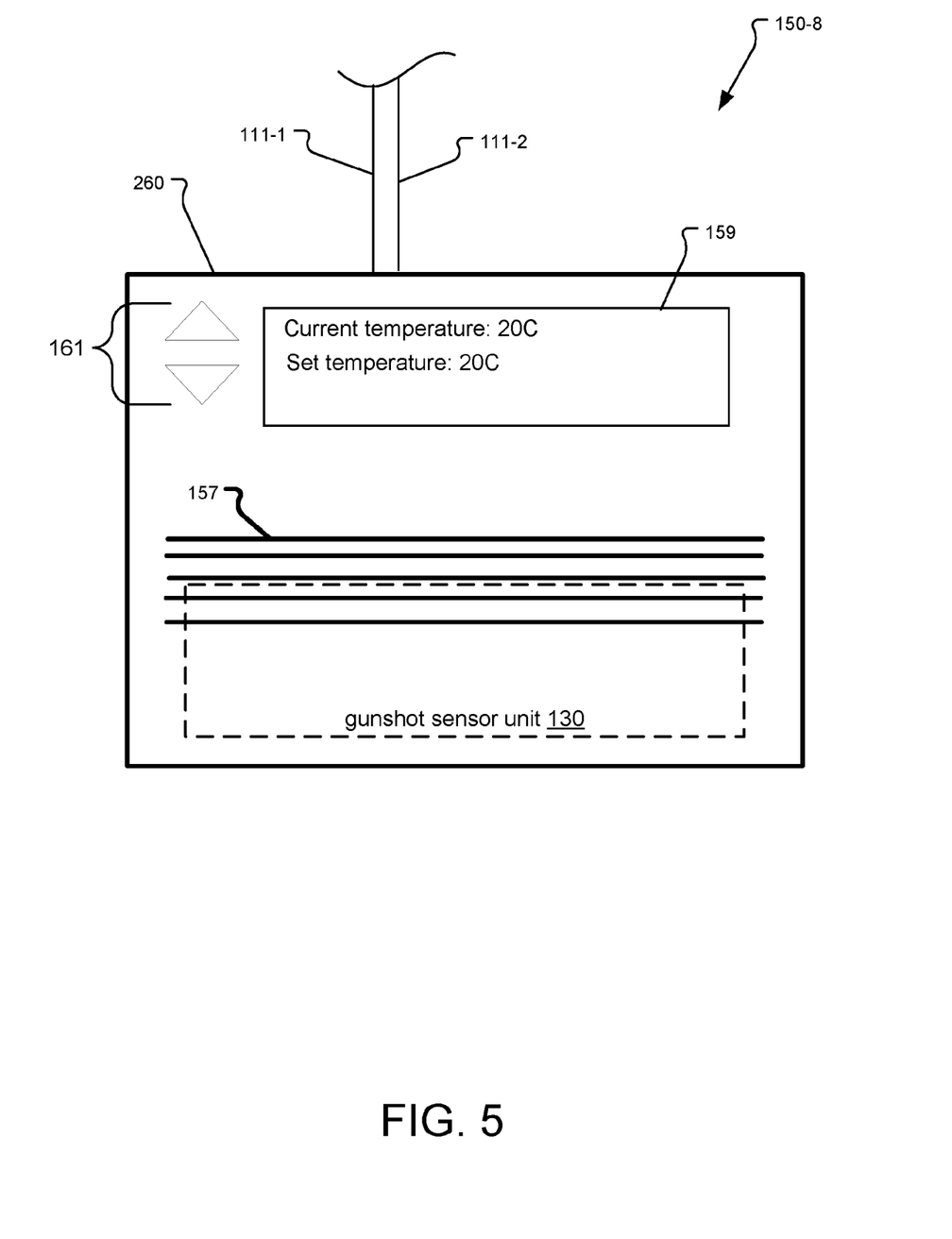
FIG. 5 is an illustration of an exemplary gunshot sensor unit integrated with a thermostat of a building automation system.

FIG. 5 is an illustration of an exemplary gunshot sensor unit 130 integrated with a thermostat 150-8 of a building automation system. In the illustrated example, the gunshot sensor unit 130 shares a common housing 260 with the thermostat 150-8, which is mounted to a wall of an area 52 of the premises 50.

As with the previous examples, the common housing 260 fully or partially encloses the gunshot sensor elements in addition to the building management elements of the thermostat 150-8 such as a controller, sensors and/or user interface elements, for example. In the illustrated example, the building management elements of the thermostat 150-8 include control buttons 161 which enable occupants to input a set temperature, and a screen 159 for displaying information such as the set temperature or current temperature. The integrated gunshot sensor unit 130 and/or gunshot sensor elements, indicated with dashed lines, are concealed within the common housing 260, which includes the grill 157 cut or formed at a front face of the common housing 260 near the location of the integrated gunshot sensor unit 130 as in the fire notification device 150-4 example.

Figure 6:
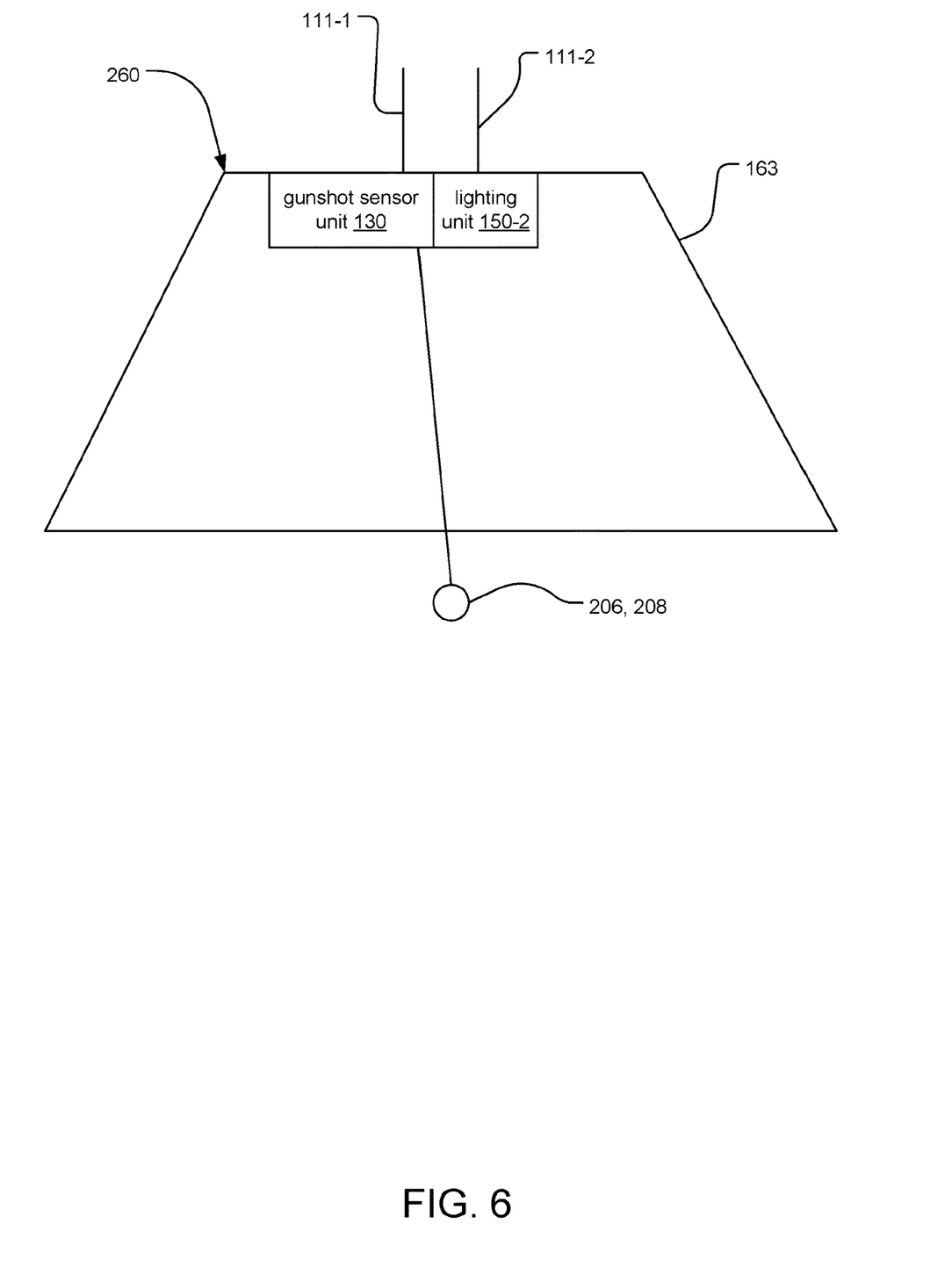
FIG. 6 is an illustration of an exemplary gunshot sensor unit integrated with a lighting unit of a building automation system.

FIG. 6 is an illustration of an exemplary gunshot sensor unit 130 integrated with a lighting unit 150-2 of a building automation system. In the illustrated example, the gunshot sensor unit 130 shares a common housing 260 with the lighting unit 150-2, which is mounted to a ceiling of an area 52 of the premises 50, for example.

As before, the gunshot sensor unit 130 shares a common housing with the lighting unit 150-2. Now, however, the common housing includes a hemi-spherically or paraboloidally shaped reflector 163, which is normally used by the lighting units 150-2 to direct light emitted by the lighting units 150-2 into or toward areas 52 of the premises 50 being illuminated by the lighting units 150-2. The reflector 163 also collects and focuses sound waves onto the microphones 206, 208, which, in the illustrated embodiment, are external to a main housing for the gunshot sensor unit 130, electrically connected to the gunshot sensor unit 130 (e.g. via a wire), and secured in a position enabling the reflector 163 to collect and focus the sound waves onto the microphones 206, 208 (e.g. at a focal point of the reflector 163).

In one embodiment, the attachment mechanism 260 might not be a common housing but, instead, a means for securing the gunshot sensor unit 130 to an existing lighting unit 150-2 comprising a reflector 163 in a position enabling the reflector 163 to collect and focus the sound waves onto the microphones 206, 208.

In another embodiment, the gunshot sensor units 130 might simply comprise the reflector 163 independent of the lighting units 150 or other distributed devices 150.

Figure 7:
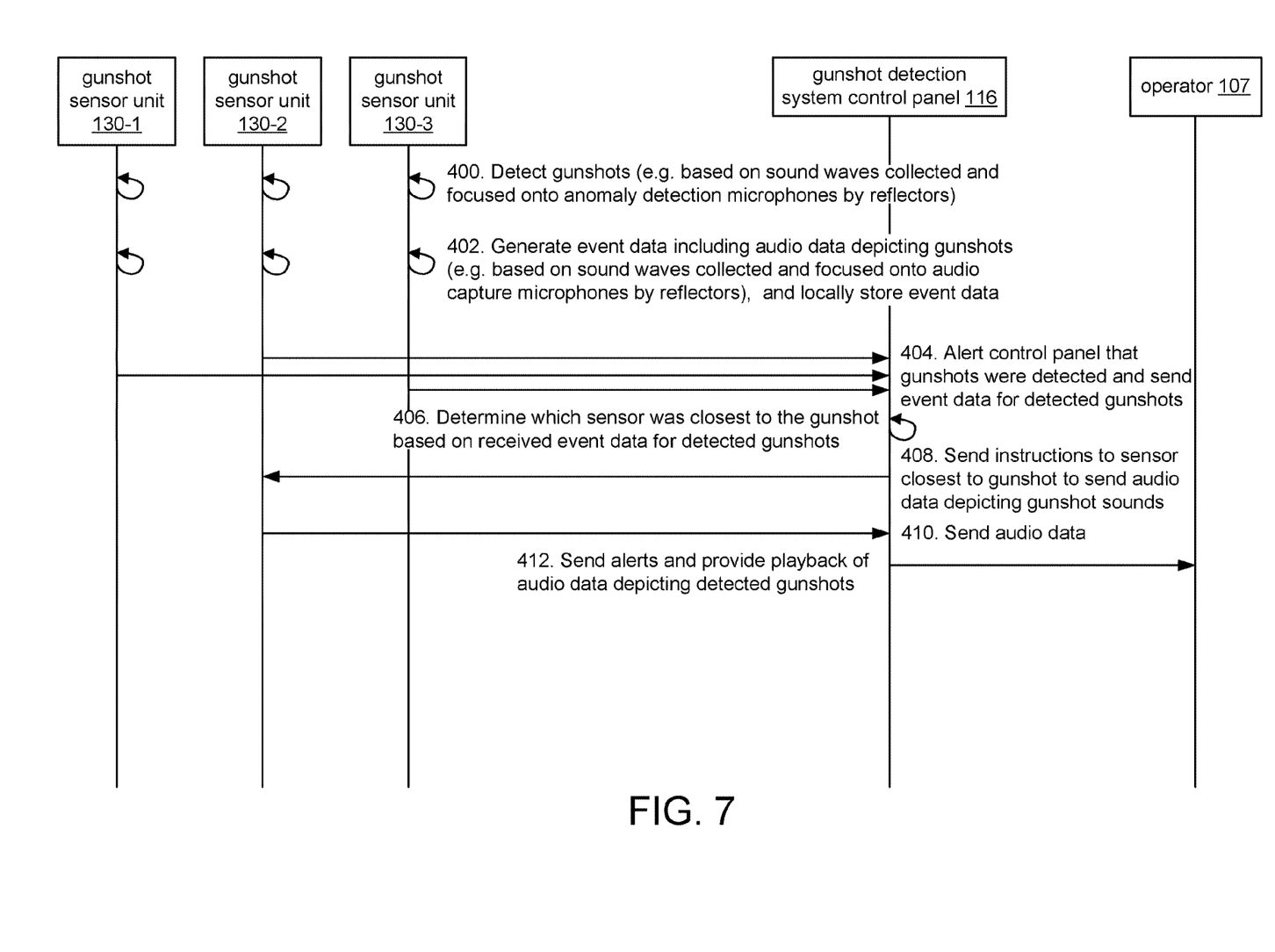
FIG. 7 is a sequence diagram illustrating operation of the gunshot detection system.

FIG. 7 is a sequence diagram illustrating operation of the gunshot detection system 100 according to the present invention.

First, in step 400, one or more of the gunshot sensor units 130 detect gunshots. These gunshot sensor units 130 might be integrated with building management distributed devices 150. For example, gunshot sensor unit 130-1 might be integrated with the fire sprinkler 150-7 as described with respect to FIG. 3, gunshot sensor unit 130-2 might be integrated with the thermostat 150-8 as described with respect to FIG. 5, and gunshot sensor unit 130-3 might be integrated with the lighting unit 150-2 as described with respect to FIG. 6. The gunshot sensor units 130 detect the gunshots by detecting acoustic anomalies indicative of the gunshot via the anomaly detection microphones 206, for example, generating an acoustic signal based on sound waves and searching the acoustic signal from the anomaly detection microphone 206 for a peak amplitude level large enough to be identified as a gunshot. Reflectors 163, either of the distributed devices 150, the gunshot sensor units 130, or hybrid gunshot sensor units, might collect and focus the sound waves onto the anomaly detection microphone 206.

In step 402, the gunshot sensor units 130 generate event data including audio data depicting the gunshots. For example, the gunshot sensor units 130 might record timestamps for the detected shots and generate the audio data based on the sound waves collected and focused onto the audio capture microphone 208. The gunshot sensor units 130 alert the gunshot detection control panel 116 that gunshots were detected and send the event data to the control panel 116 in step 404.

In step 406, the control panel 116 performs a de-confliction process and determines which gunshot sensor unit 130 was closest to the source of the acoustic anomaly based on the received event data. This process involves determining which event data received from the gunshot sensor units 130 pertain to the same acoustic anomalies and then determining which of the gunshot sensor units 130 detected each of the acoustic anomalies first (e.g. based on the metadata indicating the timing information for the gunshots).

In step 408, the control panel 116 sends instructions to the gunshot sensor unit 130-2 that was determined to be closest to the gunshots to send its full event data, including a full captured audio data sample depicting the gunshots and any ambient sound before and/or after the gunshots. In response, the gunshot sensor unit 130-2 sends the full event data including the full audio data sample to the control panel 116 in step 410.

In step 412, the control panel 116 alerts the operator 107 of the gunshots and provides audio playback of the audio data depicting the gunshots via speakers. The control panel 116 might also take other responsive actions such as storing the event data in a database and/or nonvolatile memory of the control panel 116.

While this invention has been particularly shown and described with references to preferred embodiments thereof, it will be understood by those skilled in the art that various changes in form and details may be made therein without departing from the scope of the invention encompassed by the appended claims.

What is claimed is:

1. A hybrid gunshot sensor unit, comprising:
    a gunshot sensor for detecting gunshots, the gunshot sensor comprising one or more microphones for detecting acoustic anomalies; and
    at least one building system element, wherein the at least one building system element includes a fire suppression sprinkler of a fire alarm system, wherein the gunshot sensor and the fire suppression sprinkler share a common housing.

2. The system of claim 1, wherein the gunshot sensor and the fire suppression sprinkler share a common controller directing both gunshot detection and fire alarm functionality via the gunshot sensor and the fire suppression sprinkler.

3. The system of claim 1, wherein the common housing fully or partially encloses the gunshot sensor and the fire suppression sprinkler.

4. The system of claim 3, wherein the one or more microphones of the gunshot sensor are positioned with respect to features of the common housing to allow exposure of the one or more microphones to sound waves in an environment surrounding the fire suppression sprinkler.

5. The system of claim 1, wherein the common housing includes a mount for securing the fire suppression sprinkler to a ceiling.

6. The system of claim 5, wherein the mount conceals wiring between a communication network and the gunshot sensor and/or fire suppression sprinkler.

7. The system of claim 5, wherein an anomaly detection microphone of the one or more microphones is recessed within the common housing, and audio capture microphones of the one or more microphones protrude from a top side of the common housing and operate within a space between the common housing and the ceiling.

8. The system of claim 5, wherein the fire suppression sprinkler includes a mounting plate surrounding a base of the mount, and the mounting plate collects and focuses sound waves onto the one or more microphones.

9. A system for detecting gunshots within a premises, the system comprising:
    gunshot sensor units for detecting gunshots, each of the gunshot sensor units comprising an attachment mechanism for attaching the gunshot sensor units to existing distributed devices of one or more building management systems for the premises,
    wherein housings of the existing distributed devices comprise grills for providing ventilation for internal components of the existing distributed devices, the gunshot sensor units are concealed within the housings, and the grills enable microphones of the gunshot sensor units to operate while also being hidden from view.

10. The system of claim 1, wherein the gunshot sensor unit and the existing distributed device to which the gunshot sensor unit is secured via the attachment mechanism are discrete devices having separate housings and components, and the attachment mechanism secures the discrete devices together.

11. The system of claim 9, wherein the existing distributed devices include fire notification devices of a fire alarm system and/or thermostats of a building automation system.

12. A method for detecting gunshots within a premises, the method comprising:
    attaching gunshot sensor units to existing distributed devices of one or more building management systems for the premises via attachment mechanisms of the gunshot sensor units, wherein the gunshot sensor units detect gunshots,
    wherein housings of the existing distributed devices comprise grills for providing ventilation for internal components of the existing distributed devices, the gunshot sensor units are concealed within the housings, and the grills enable microphones of the gunshot sensor units to operate while also being hidden from view.

* * * * *

UNITED STATES PATENT AND TRADEMARK OFFICE
CERTIFICATE OF CORRECTION

PATENT NO. : 11,361,638 B2
APPLICATION NO. : 16/968944
DATED : June 14, 2022
INVENTOR(S) : Connell, II et al.

Page 1 of 1

It is certified that error appears in the above-identified patent and that said Letters Patent is hereby corrected as shown below:

In the Claims

In Claim 10, Column 14, Line 24, delete "The system of claim 1, wherein the gunshot sensor" and insert --The system of claim 9, wherein the gunshot sensor--.

Signed and Sealed this
Nineteenth Day of July, 2022

Katherine Kelly Vidal
*Director of the United States Patent and Trademark Office*